United States Patent
Kane et al.

(10) Patent No.: US 12,189,104 B2
(45) Date of Patent: Jan. 7, 2025

(54) METHODS AND APPARATUS FOR OPTIMISED INTERFEROMETRIC SCATTERING MICROSCOPY

(71) Applicant: REFEYN LTD, Oxford (GB)

(72) Inventors: Josiah Kane, Oxford (GB); Max Felix Hantke, Oxford (GB); Lewis Carney, Oxford (GB)

(73) Assignee: REFEYN LTD, Oxford (GB)

( * ) Notice: Subject to any disclaimer, the term of this patent is extended or adjusted under 35 U.S.C. 154(b) by 183 days.

(21) Appl. No.: 17/912,260

(22) PCT Filed: Mar. 15, 2021

(86) PCT No.: PCT/GB2021/050639
§ 371 (c)(1),
(2) Date: Sep. 16, 2022

(87) PCT Pub. No.: WO2021/186154
PCT Pub. Date: Sep. 23, 2021

(65) Prior Publication Data
US 2023/0185067 A1    Jun. 15, 2023

(30) Foreign Application Priority Data
Mar. 18, 2020  (GB) ...................... 2003946

(51) Int. Cl.
*G02B 21/00*     (2006.01)
(52) U.S. Cl.
CPC ..... *G02B 21/0028* (2013.01); *G02B 21/0032* (2013.01); *G02B 21/0056* (2013.01); *G02B 21/0084* (2013.01)
(58) Field of Classification Search
CPC ............ G02B 21/0028; G02B 21/0032; G02B 21/0056; G02B 21/0084; G02B 21/14;
(Continued)

(56) References Cited

U.S. PATENT DOCUMENTS

| | | | | |
|---|---|---|---|---|
| 3,819,270 A | * | 6/1974 | Hirschfeld | ............... G01N 1/38 |
| | | | | 356/343 |
| 6,724,419 B1 | * | 4/2004 | Green | .................. G02B 21/367 |
| | | | | 348/79 |

(Continued)

FOREIGN PATENT DOCUMENTS

| WO | WO-2018/011591 A1 | 1/2018 |
|---|---|---|
| WO | WO-2020/104814 A2 | 5/2020 |

OTHER PUBLICATIONS

Bujak et al., "Interferometric scattering (iSCAT) microscopy for high fidelity tracking at microseconds timescales," Proc. of SPIE 10726:1072615 (2018) (8 pages).

(Continued)

*Primary Examiner* — Mohamed K Amara
(74) *Attorney, Agent, or Firm* — Clark & Elbing LLP (57) ABSTRACT

A method of imaging a sample by interferometric scattering microscopy, the method comprising illuminating a sample with at least one light source, the sample being held at a sample location comprising a reflective surface, such that a reflected signal is formed; the reflected signal comprising light from the light source and light scattered by the sample; detecting the output light over a first time window for a first frame $N_1$; detecting the output light over a second time window for a second frame $N_2$; calculating a ratiometric signal R which is the ratio of $N_1$ and $N_2$ minus 1; estimating the ratiometric motion signature $S=(S_x, S_y)$ from frames $N_1$ and $N_2$ with S defined as the ratiometric image which would be measured from an invariant sample moving along x and y for a given motion vector $m=(m_x, m_y)$; estimating m as the most consistent vector such that R is approximated using S and m; calculating the corrected ratiometric contrast image R* from R, S and m.

9 Claims, 4 Drawing Sheets

(58) Field of Classification Search
CPC .............. G02B 21/367; G02B 21/0004; G01N 2015/1006; G01N 2015/1454; G01N 15/1425; G01N 15/1429; G01N 15/1434

See application file for complete search history.

(56) References Cited

U.S. PATENT DOCUMENTS

| | | | | |
|---|---|---|---|---|
| 9,921,406 | B2* | 3/2018 | Wang | G02B 21/0036 |
| 2003/0036855 | A1* | 2/2003 | Harris | G02B 21/0028 |
| | | | | 382/128 |
| 2005/0014201 | A1* | 1/2005 | Deutsch | B01L 3/5027 |
| | | | | 702/19 |
| 2010/0128276 | A1 | 5/2010 | De Groot et al. | |
| 2012/0194903 | A1 | 8/2012 | Nishikawa | |
| 2014/0340482 | A1* | 11/2014 | Kanarowski | G02B 21/16 |
| | | | | 348/46 |
| 2015/0004637 | A1* | 1/2015 | Cohen | G02B 21/361 |
| | | | | 359/380 |
| 2015/0247790 | A1* | 9/2015 | Okumus | G01N 15/1484 |
| | | | | 435/283.1 |
| 2019/0004299 | A1* | 1/2019 | Kukura | G02B 21/008 |
| 2020/0132976 | A1* | 4/2020 | Ameer-Beg | G02B 21/0036 |
| 2023/0063843 | A1* | 3/2023 | Prater | G01N 21/1717 |
| 2024/0035950 | A1* | 2/2024 | Harke | G06T 7/246 |
| 2024/0061226 | A1* | 2/2024 | Boppart | G01B 9/02091 |
| 2024/0094517 | A1* | 3/2024 | Cunningham | G01N 21/47 |

OTHER PUBLICATIONS

Cheng et al., "Background estimation and correction for high-precision localization microscopy," ACS Photonics 4(7):1730-1739 (2017).

Hsieh et al., "Tracking single particles on supported lipid membranes: multimobility diffusion and nanoscopic confinement," J. Phys. Chem. B 118(6):1545-1554 (2014).

International Search Report and Written Opinion dated Jun. 9, 2021, for PCT International Application No. PCT/GB2021/050639, Kane et al., "Methods and Apparatus for Optimised Interferometric Scattering Microscopy," filed Mar. 15, 2021 (12 pages).

Liebel et al., "Ultrasensitive Label-Free Nanosensing and High-Speed Tracking of Single Proteins," Nano Lett. 17(2):1277-1281 (2017).

Ortega-Arroyo et al., "Interferometric scattering microscopy (iSCAT): new frontiers in ultrafast and ultrasensitive optical microscopy," Phys. Chem. Chem. Phys. 14(45):15625-15636 (2012) (13 pages).

Spindler et al., "Visualization of lipids and proteins at high spatial and temporal resolution via interferometric scattering (iSCAT) microscopy," J. Phys. D: Appl Phys. 49(27):274002 (2016) (8 pages).

Taylor et al., "Interferometric scattering microscopy reveals microsecond nanoscopic protein motion on a live cell membrane," Nat. Photonics. 13:480-487 (2019).

Combined Search and Examination Report dated Sep. 17, 2020, for GB2003946.7, Kane et al., "Methods and apparatus for optimised interferometric scattering microscopy," filed Mar. 18, 2020 (5 pages).

\* cited by examiner

METHODS AND APPARATUS FOR OPTIMISED INTERFEROMETRIC SCATTERING MICROSCOPY

FIELD

The present invention relates to methods and apparatus for optimised interferometric scattering microscopy (referred to herein as IScat).

BACKGROUND

IScat has materialized as a powerful approach to both single particle tracking with unique spatiotemporal resolution and label-free sensitivity down to the single molecule level and single particle mass determination by mass photometry and mass imaging IScat is disclosed, for example in Kukura et al., "High-speed nanoscopic tracking of the position and orientation of a single virus", Nature Methods 2009 6:923-935, and in Ortega Arroyo et al. "Interferometric scattering microscopy (IScat): new frontiers in ultrafast and ultrasensitive optical microscopy", Physical Chemistry Chemical Physics 2012 14:15625-15636.

Despite considerable potential, widespread application of IScat has been limited by the requirement for custom-built microscopes, unconventional cameras and complex sample illumination, limiting that capabilities of IScat for the robust and accurate detection, imaging and characterisation of objects as small as single molecules.

In our previous patent, WO 2018/011591, we disclosed an interferometric scattering microscope comprising a novel, contrast-enhancing spatial mask configured to improve the relative amplitudes of reference and scattered light fields. The microscope described therein is capable of achieving sensitivity similar to that of conventional IScat techniques, but with a drastic reduction in the complexity and expense of implementation, to the extent that a conventional microscope could be configured to perform IScat by simple modification and inclusion of the spatial mask.

However, a number of limitations to the measurement sensitivity attainable using that approach have become apparent to the inventors of the present application.

To detect the signal generated by particles that bind to the boundary in an IScat microscope the ratio between adjacent frames is often used. Thus a ratiometric contrast image is calculated which displays the relative change in pixel intensity from two running frames before and after the given point in time.

However, if the sample moves between adjacent frames this can cause problems. As sample motion is also associated with changes in pixel intensities these are also detected in ratiometric images and cause problems with the detection of particles and mass determination from the data. Indeed the high sensitivity of the technique means that the signal from a particle can be drowned out by the motion of the sample carrier even with travel distances smaller than one pixel. Movements as small as 1% of the pixel size give rise to signals that have the same amplitude as a single protein. Thus even very small motion can give highly erroneous signals.

Current methods for correcting for motion at a sub-pixel level include iterative image registration, Fourier transforms and optical flow. Such methods cannot be directly applied to ratiometric images and cannot be performed precisely enough in real time at a kHz frame rate.

The present invention provides methods and apparatus for optimised IScat techniques which correct for the motion of the sample. The methods disclosed herein address this by detecting the motion and subtracting it from the signal.

SUMMARY OF INVENTION

According to an aspect of the present invention, a method of imaging a sample by interferometric scattering microscopy is provided.

The method comprises a method of imaging a sample by interferometric scattering microscopy, the method comprising: illuminating a sample with at least one light source, the sample being held at a sample location comprising a reflective surface, such that a reflected signal is formed; the reflected signal comprising light from the light source and light scattered by the sample; detecting the output light over a first time window for a first frame $N_1$; detecting the output light over a second time window for a second frame $N_2$; calculating a ratiometric signal R, which is the ratio of $N_1$ and $N_2$ minus 1; estimating the ratiometric motion signature $S=(S_x, S_y)$ from the native camera frames $N_1$ and $N_2$, which is the ratiometric image which would be measured from an invariant sample moving along x and y for a given motion vector $m=(m_x, m_y)$; estimating m as the most consistent vector such that R is approximated using S and m; and calculating the corrected ratiometric contrast image R* from R, S and m.

By removing the motion signature from the ratiometric signal in this way, rather than by conventional image alignment, the image can still be processed in real time at a rate of kHz.

The horizontal and vertical ratiometric motion signature $S_x$ and $S_y$ at pixel location (x, y) are estimated from a native image N as:

$$S_x[x,y]=(N[x+1,y]-N[x-1,y])/(2N[x,y])$$

$$S_y[x,y]=(N[x,y+1]-N[x,y-1])/(2N[x,y])$$

m is estimated as the most consistent vector such that $R=m_x S_x+m_y S_y$.

The corrected ratiometric contrast image frame R* is calculated as $$R^*=R-(m_x S_x+m_y S_y)$$

Based on the calculated motion vector m the sample can be moved or stabilised with high precision actuators to compensate for the movement, drift or vibration.

Additionally, or alternatively an alert is triggered if the detected motion is above a predetermined level which alerts the user that the detected image may not be reliable.

A method according to any of the preceding claims further comprising moving the sample to compensate for the motion.

The first frame may comprise the average across a first plurality of native frames and the second frame comprises the average across a second plurality of native frames.

The method may further comprise passing at least one of the reflected signal through a spatial filter, the spatial filter being configured to effect a reduction in intensity on incident radiation, the reduction in intensity being greater within a predetermined numerical aperture. Using a spatial filter removes a large proportion of the reflected light. However, as the scattered light is generally at a higher aperture it is not removed by the spatial filter. Thus an image with greater contrast is achieved by the use of this spatial filter.

The light source may be a coherent light source.

According to the invention there is provided an interferometric scattering microscope comprising: a sample holder for holding a sample in a sample location; an illumination source arranged to provide illuminating light; a detector; an optical system being arranged to direct illuminating light onto the sample location and being arranged to collect output light in reflection, the output light comprising both light scattered from the sample location and illuminating light reflected from the sample location, and to direct the output light to the detector; a spatial filter positioned to filter the output light, the spatial filter being arranged to pass output light but with a reduction in intensity that is greater within a predetermined numerical aperture than at larger numerical apertures; and computer program means configured to instruct the apparatus to carry out the steps as described above.

An interferometric scattering microscope as described above further comprising an actuator to stabilise the sample in response to the estimated motion vector m. The actuator may be a motorised actuator.

The present invention may be applied with advantage to a sample comprising objects having a scattering cross section with respect to the illuminating light of $10^{-15}$ $m^2$ or less. Typically such objects may also have a scattering cross section with respect to the illuminating light of $10^{-26}$ $m^2$ or more, i.e. within a range from $10^{-15}$ $m^2$ from $10^{-26}$ $m^2$. Examples of objects that may be studied include proteins or small aggregates thereof as well as metallic, organic or inorganic nanoparticles.

In order to image objects that are very weak scatterers, the spatial filter is arranged to pass output light with a reduction in intensity within the predetermined numerical aperture to $10^{-2}$ of the incident intensity or less. Typically, the spatial filter may be arranged to pass output light with a reduction in intensity within the predetermined numerical aperture to $10^{-4}$ of the incident intensity or more, for example in the range from $10^{-2}$ to $10^{-4}$ of the incident intensity.

FIGURES

To allow better understanding, embodiments of the present invention will now be described by way of non-limitative example with reference to the accompanying drawings, in which.

DETAILED DESCRIPTION

In the systems and methods described herein, the light used may be: ultraviolet light (which may be defined herein as having wavelengths in the range from 10 nm to 380 nm); visible light (which may be defined herein as having wavelengths in the range from 380 nm to 740 nm); infrared light (which may be defined herein as having wavelengths in the range from 740 nm to 300 μm). The light may be a mixture of wavelengths. Herein, the terms 'optical' and 'optics' are used to refer generally to the light to which the methods are applied.

Figure 1:
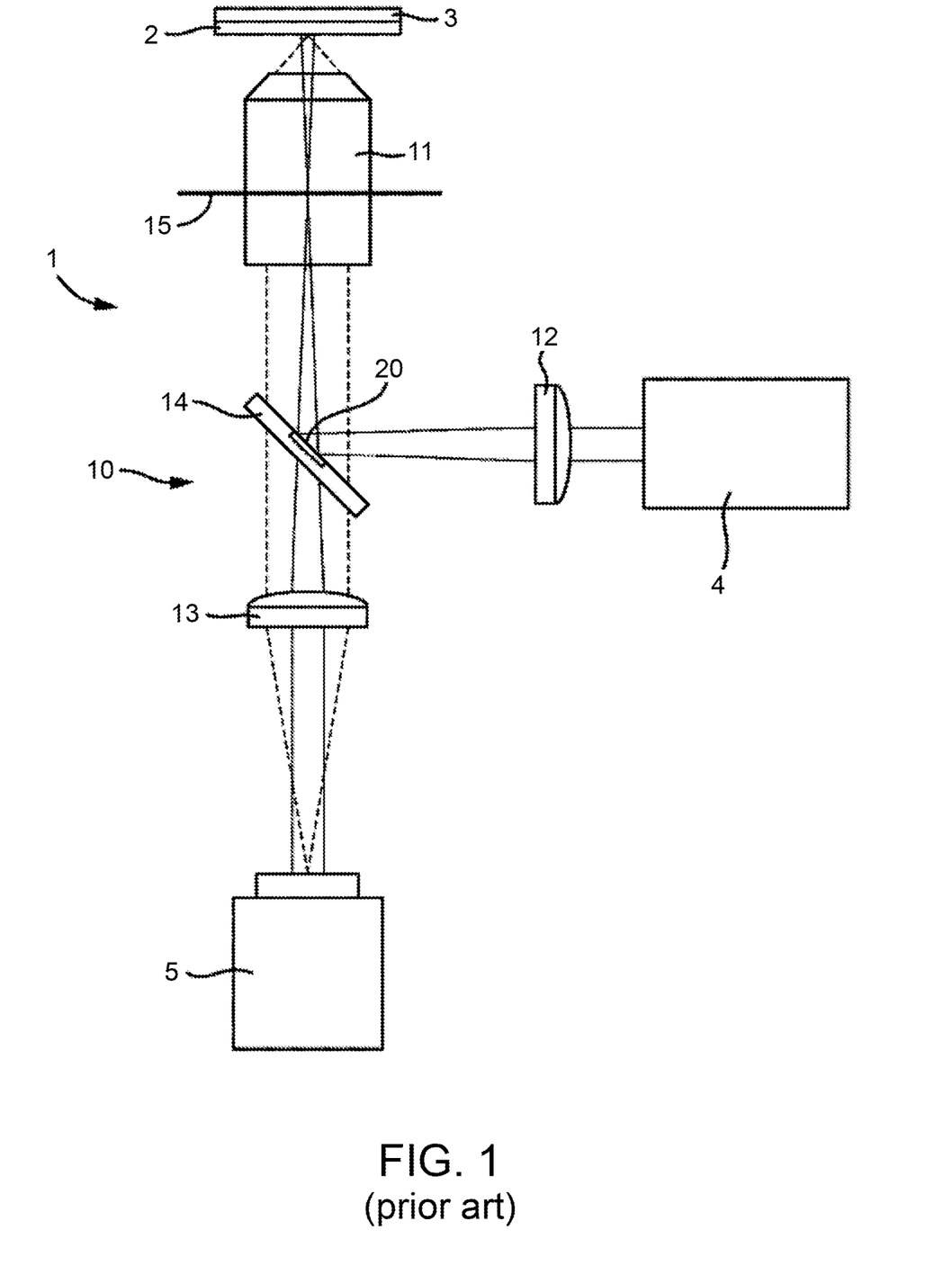
FIG. 1 is a schematic diagram of an IScat microscope of the prior art.
Figure 2:
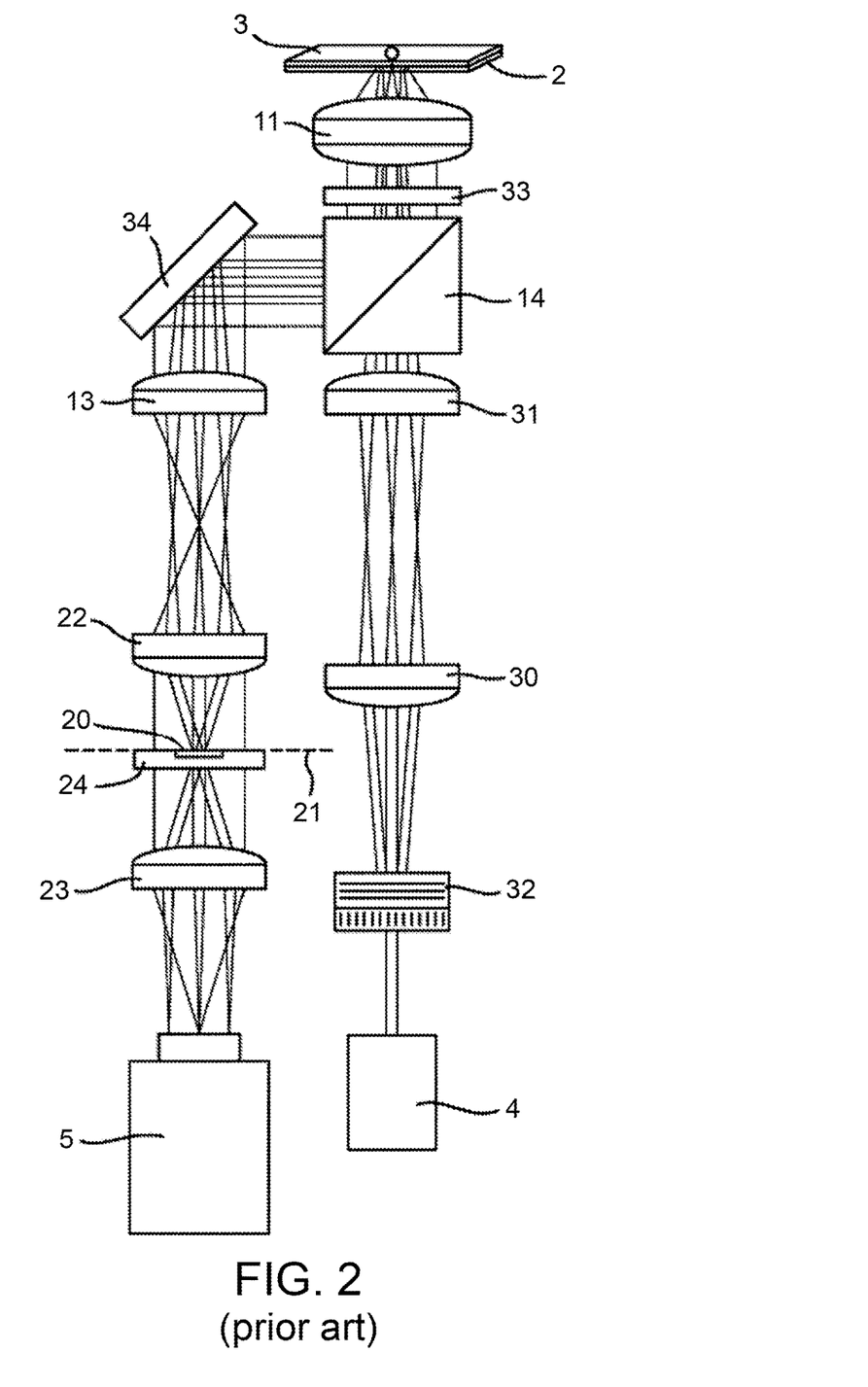
FIG. 2 is a schematic diagram of a modified IScat microscopes of the prior art.

FIG. 1 and FIG. 2 illustrate IScat microscope configurations disclosed in WO 2018/011591 which have a number of structural features and functionalities in common with the apparatus and methods of the present invention.

The disclosure of WO 2018/011591 is incorporated herein by reference, however for completeness the following description will set out the components and functionalities of the IScat microscope of the present invention which are in common with those of WO 2018/011591 and which are shown in FIG. 1 and FIG. 2, then describe the various improvements to said configurations provided by the present disclosure and provide example embodiments thereof.

Thus, referring to FIG. 1, the microscope 1 comprises a sample holder 2 for holding a sample 3 at a sample location. The sample 3 may be a liquid sample comprising objects to be imaged, which are described in more detail below. The sample holder 2 may take any form suitable for holding the sample 3. Typically, the sample holder 2 holds the sample 3 on a surface, which forms an interface between the sample holder 2 and the sample 3. For example, the sample holder 2 may be a coverslip and/or may be made from glass. The sample 3 may be provided on the sample holder 2 in a straightforward manner, for example using a micropipette.

The microscope 1 further comprises an illumination source 4 and a detector 5. The illumination source 4 is arranged to provide illuminating light. The illuminating light may be coherent light. For example, the illumination source 4 may be a laser. The wavelength of the illuminating light may be selected in dependence on the nature of the sample 3 and/or the properties to be examined. In one example, the illuminating light has a wavelength of 405 nm.

Optionally, the illumination light may be modulated spatially to remove speckle patterns that arise from the coherent nature of the illumination and laser noise, for example as detailed in Kukura et al., "High-speed nanoscopic tracking of the position and orientation of a single virus", Nature Methods 2009 6:923-935.

The detector 5 receives output light in reflection from the sample location. The illuminating light that reaches the detector is reflected predominantly from a surface of the sample, typically an interface between the sample and the sample holder, thereby providing interference with objects in the sample close to that surface.

A relatively small amount, typically only 0.5%, of the illumination light is reflected in examples where a glass-water interface is used, while a significantly higher amount, typically greater than 90%, of light scattered by a nanoscopic object at the interface, is scattered back towards the illumination direction. This intrinsically improves the ratio between scattered and reflected light fields more than 1000-fold compared to transmission-type geometries, resulting in a larger interferometric contrast. As a result, three orders of magnitude fewer photons need to be detected to achieve the same nominal signal-to-noise given a specific scatterer, illumination intensity, and exposure time, than for transmission-type setups.

Typically, the microscope 1 may operate in a wide-field mode, in which case the detector 5 may be an image sensor that captures an image of the sample 3. The microscope 1 may alternatively operate in a confocal mode, in which case the detector 5 may be an image sensor or may be a point-like detector, such as a photo-diode, in which case a scanning arrangement may be used to scan a region of the sample 3 to build up an image. Examples of image sensors that may be employed as the detector 5 include a CMOS (complementary metal-oxide semiconductor) image sensor or a CCD (charge-coupled device).

The microscope 1 further comprises an optical system 10 arranged between the sample holder 2, the illumination source 4 and the detector 5. The optical system 10 is arranged as follows to direct illuminating light onto the sample location for illuminating the sample 3, and to collect output light in reflection from the sample location and to direct the output light to the detector 5.

The optical system 10 includes an objective lens 11 which is a lens system disposed in front of the sample holder 2. The optical system 10 also includes a condenser lens 12 and a tube lens 13. The condenser lens 12 condenses illuminating light from the light source 11 (shown by continuous lines in FIG. 1) through the objective lens 11 onto the sample 3 at the sample location.

The objective lens 11 collects the output light which comprises both (a) illuminating light reflected from the sample location (shown by continuous lines in FIG. 1), and (b) light scattered from the sample 3 at the sample location (shown by dotted lines in FIG. 1). The reflected light is predominantly reflected from the interface between the sample holder 2 and the sample 3.

Typically, this is a relatively weak reflection, for example a glass-water reflection. For example, the intensity of the reflected illuminating light may be of the order of 0.5% of the intensity of the incident illuminating light. The scattered light is scattered by objects in the sample 3. Scattered light from objects at or close to the surface of the sample constructively interfere with the reflected light and so are visible in the image captured by the detector 5.

As shown in FIG. 1, the reflected illuminating light and the scattered light have different directionalities. In particular, the reflected illuminating light has a numerical aperture resulting from the geometry of the beam of light output by the light source 4 and the optical system. The scattered light is scattered over a large range of angles and so fills larger numerical aperture than the reflected illuminating light. The tube lens 13 focuses the output light from the objective lens 11 onto the detector 5.

The optical system 10 also includes a beam splitter 14 that is arranged to split the optical paths for the illuminating light from the light source 4 and the output light directed to the detector 5. The beam splitter 14 may have a conventional construction that provides partial reflection and partial transmission of light incident thereon.

In the examples of the present disclosure, the light source 4 is offset from the optical path of the objective lens 11 so that the illuminating light from the light source 4 is reflected by the beam splitter 14 into the objective lens 11, and conversely the detector 5 is aligned with the optical path of the objective lens 11 so that the output light from the sample location is transmitted through the beam splitter 14 towards the detector 5.

In addition to the components described above that may be of a conventional construction, the microscope 1 includes a spatial mask or filter 20. In the example of FIG. 1, the spatial filter 20 is formed on the beam splitter 14 and is thereby positioned behind the back aperture of the objective lens 11, and so directly behind the back focal plane 15 of the objective lens 11, however the spatial filter 20 may be placed on other points along the optical path of the IScat microscope to achieve the same effect as described below.

The spatial filter 20 is positioned to filter the backpropagating output light passing from the sample holder interface to the detector 5. In the examples of the present disclosure in which the detector 5 is aligned with an optical path of the objective lens 11, the spatial filter 20 is therefore transmissive.

The spatial filter 20 is partially transmissive and therefore passes the output light, which includes the reflected illumination light, but with a reduction in intensity. The spatial filter 20 is also aligned with the optical axis and has a predetermined aperture so that it provides a reduction in intensity within a predetermined numerical aperture. Herein, numerical aperture is defined in its normal manner as being a dimensionless quantity characterising a range of angles with respect to the sample location from which the output light originates.

Specifically, the numerical aperture NA may be defined by the equation: NA=n·sin(θ), where θ is the half angle of collection and n is the refractive index of the material through which the output light passes (for example the material of the components of the optical system 10).

The spatial filter 20 may be formed in any suitable manner, typically comprising a layer of deposited material. The material may be, for example, a metal such as silver. In some embodiments, the spatial filter may comprise one or more dielectric coatings. In some embodiments, the spatial filter may be formed so as to be partially reflective to incident radiation within a given range of angles. The deposition may be performed using any suitable technique.

As sub-diffraction sized objects near an interface scatter light preferentially into a larger numerical aperture than the reflected illuminating light, the reduction in intensity provided by the spatial filter 20 preferentially reduces the intensity in detection of the reflected illuminating light over the scattered light. Accordingly, the reduction in intensity by the spatial filter 20 at low numerical apertures predominantly affects the reflected illuminating light and has a minimal effect on the scattered light, thereby maximising the contrast in the capture image. The enhanced imaging contrast enables high contrast detection of objects that are weak scatterers.

The contrast enhancement may be understood as follows. As the spatial filter 20 passes part of the output light in the predetermined numerical aperture (i.e. is partially transmissive in this example), fractions of illuminating light and scattered light fields reach the detector and interfere for a sufficiently coherent illumination source. The light intensity reaching the detector $I_{det}$ is then given by:

$$I_{det}=|E_{inc}|^2\{r^2t^2+|s|^2+2rt|s|\cos\Phi\},$$

where $E_{inc}$ is the incident light field, $r^2$ is the reflectivity of the interface and $t^2$ is the transmissivity of the spatial filter 20, s is the scattering amplitude of the object, and Φ is the phase difference between transmitted illuminating light and the scattered light.

The additional filtering provided by the spatial filter 20 enables the amplitude of the reference field to be tuned directly through selection of the transmissivity $t^2$ of the spatial filter 20, as opposed to being fixed by the reflectivity of a glass-water interface as in standard IScat. In the case that the spatial filter 20 is a layer of deposited material, the transmissivity $t^2$ may be selected by choice of the material and/or thickness of the layer. Such tuning may be performed according to, for example, the scattering object of interest, the camera full well capacity, and magnification.

Brightfield illumination ensures that the strongest unwanted back-reflections, usually originating from the objective, are directed away from the detector 5, minimising imaging background and enabling large fields of view without complex scanning of the beam of illuminating light.

In order to image objects that are relatively weak scatterers, the spatial filter 20 may be arranged to pass reflected illuminating light with a reduction in intensity within the predetermined numerical aperture to an intensity in the range from $10^{-2}$ to $10^{-4}$ of the incident intensity (in this context, the intensity of the output light that is incident on the spatial filter 20).

For example, a sample comprising objects having a mass of 5000 kDa or less may be imaged. Typically, the disclosed techniques may be applied to a sample comprising objects having a mass of 10 kDa or more, for example objects having a mass within a range from 10 kDa to 5000 kDa, and/or to a sample comprising objects having a scattering cross section with respect to the illuminating light of $10^{-12}$ m² or less, or more preferably $10^{-17}$ m² or less. Typically such objects may also have a scattering cross section with respect to the illuminating light, for example, within a range from $10^{-17}$ m² from $10^{-26}$ m². Examples of objects to which the techniques of the present disclosure may be applied to image include proteins or small aggregates thereof, or their binding partners.

In order to simultaneously image stronger scatterers, the transmissivity of the second filter can be set to anywhere between 1 and $10^{-2}$, depending on the desired detection range.

Referring to FIG. 2, a second example configuration of microscope 1 is illustrated. The configuration of FIG. 2 is also disclosed in WO 2018/011591 and is similarly suitable for optimisation by application of the techniques of the present invention.

The configuration of FIG. 2 positions the spatial filter 20 at a conjugate focal plane 21 of the back focal plane of the objective lens 11, instead of being behind the back aperture of the objective lens 11. The conjugate focal plane 21 of the back focal plane 15 of the objective lens 11 is formed between a pair of telescope lenses 22 and 23 positioned behind the tube lens 13.

An acousto-optical deflector 32 is arranged after the light source 4 to provide scanning of the illuminating light. The acousto-optical deflector 32 may be operated to scan a region of the sample 3 to build up an image and/or to provide spatial modulation for removing speckle patterns that arise from the coherent nature of the illumination and laser noise, as mentioned above.

The condenser lens 12 is replaced by a pair of telecentric lenses 30 and 31 that perform the function of imaging any modifications to the beam path at the acousto-optical deflector 32 into the back focal plane of the imaging objective.

The positions of the light source 4 and the detector 5 are reversed with respect to the configuration of FIG. 1 so that the illuminating light from the light source 4 is transmitted through the beam splitter 14 into the objective lens 11, and conversely the output light from the sample location is reflected by the beam splitter 14 towards the detector 5.

The beam splitter 14 is a polarising beam splitter and a quarter wave plate 33 is arranged between the beam splitter 14 and the sample 3, so that the beam splitter 14 splits the light. A mirror 34 is arranged to deflect the output light reflected by the beam splitter 14.

A ratiometric frame R is calculated from the two native frames $N_1$ and $N_2$ such that for each pixel at location (x, y) the ratiometric signal is calculated as:

$R[x,y]=N_2[x,y]/N_1[x,y]-1$

However, if the sample moves between frames $N_1$ and $N_2$ there is a contribution from neighbouring pixels. For example, for sub-pixel movement a pixel at location (x, y) may have contributions from any adjacent pixels including (x+1, y), (x−1, y), (x, y+1) and (x, y−1).

Taking motion solely in the x direction there may be a motion contribution $m_x$ to pixel $N_2[x, y]$ at time of the acquisition of $N_2$ from pixel $N_1[x+1, y]$ at frame $N_1$. At first order, this could be expressed as:

$N_2[x,y]=m_x N_1[x+1,y]+(1-m_x)N_1[x,y]$

The contribution to the ratiometric image would be:

$$m_x\left(\frac{N1[x+1, y]}{N1[x, y]} - 1\right) + 1$$

Thus if the ratio of adjacent pixels can be calculated the motion contribution can be calculated as the value of $m_x$ which fits best across all pixels in the frame.

Similarly, for motion in y direction there may be a motion contribution $m_y$ to pixel $N_2[x, y]$ at time of the acquisition of $N_2$ from pixel $N_1[x, y+1]$ at frame $N_1$. This would give a contribution to the ratiometric image of:

$$m_y\left(\frac{N1[x, y+1]}{N1[x, y]} - 1\right) + 1$$

Looking at two dimensions a motion vector of $m=(m_x, m_y)$ between frames. m is estimated from R and S as the most consistent vector such that $R=m_x S_x + m_y S_y$ The horizontal and vertical motion signature Sx and Sy at pixel index (x, y) can be estimated from a native image N as:

$S_x[x,y]=(N[x-1,y]-N[x+1,y])/(2N[x,y])$ $S_y[x,y]=(N[x,y-1]-N[x,y+1])/(2N[x,y])$

The motion corrected ratiometric image R* can then be calculated as $R^*=R-(m_x S_x + m_y S_y)$ Although this has used linear interpolation between pixels more advanced interpolation such as Lanczos resampling could be used to generate a more refined motion estimate. Furthermore the approach could be applied to motion of more than one pixel by calculating the gradient of pixels across a frame.

Other applications of this method include the detection of motion parallel to the direction of observation. This would be detected as a non-linear motion (instead of a linear motion from translation, as described above). Blur within an image would need to be calibrated with the optical properties of the microscope.

Although the description uses individual native frames $N_1$ and $N_2$ an average of frames could be used in place of the native frames.

The IScat microscope may include an alarm or alert in which an alarm or alert is signalled if the detected motion is above a predetermined value. The alarm may be an audio or visual alarm.

The IScat microscope may include actuators to correct, or compensate for movement, drift or vibration. The actuators may be motorised actuators which may be able to move the sample in three orthogonal directions.

Figure 3:
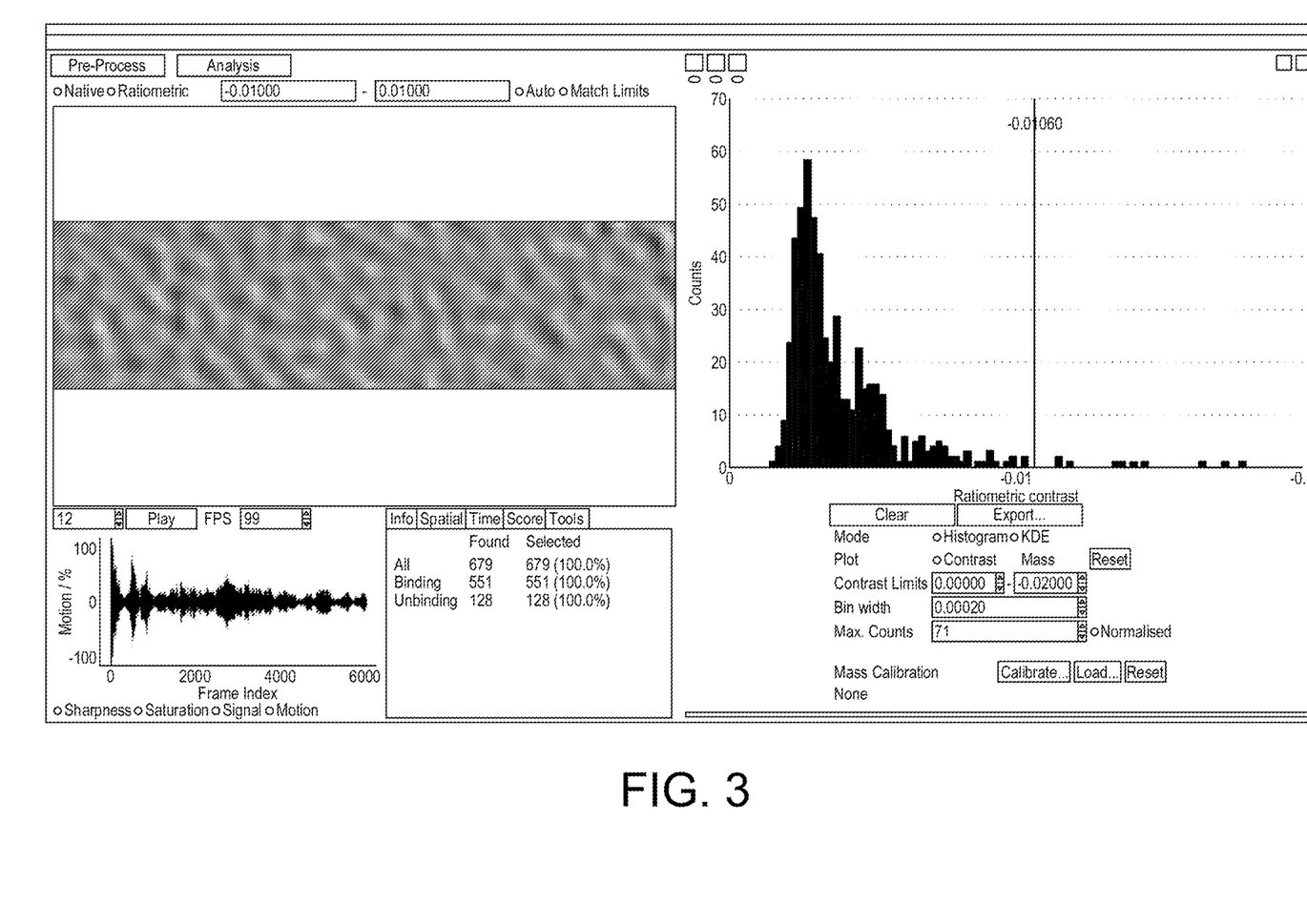
FIG. 3 shows an image from an IScat microscope to which motion correction has not been applied.
Figure 4:
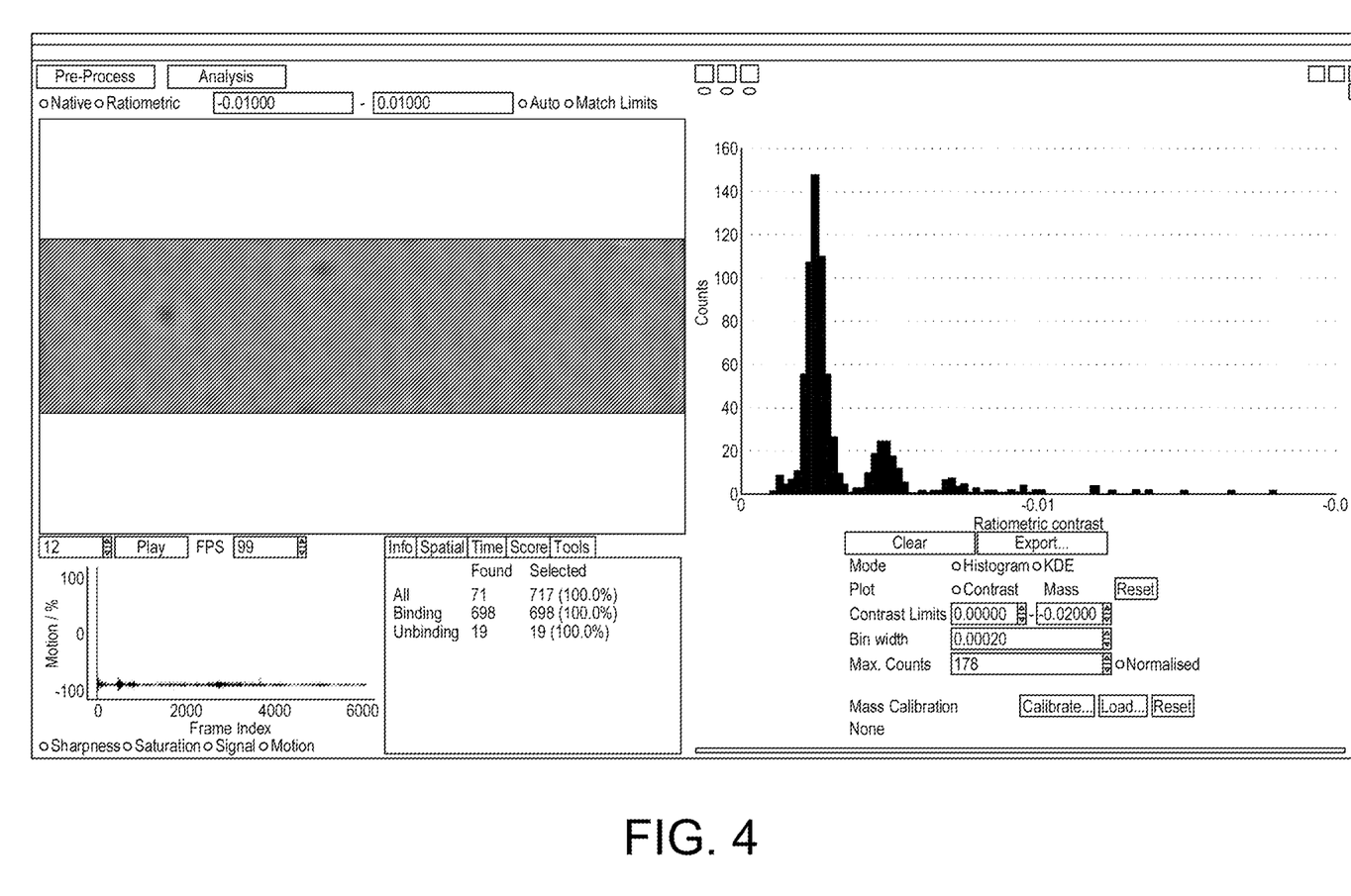
FIG. 4 shows an image from an IScat microscope to which motion correction according to the invention has been applied.

FIGS. 3 and 4 show images from an IScat microscope from a sample with three distinct species of molecule: a monomer, a dimer and a trimer.

FIG. 3 depicts a (ratiometric) frame captured on an IScat microscope without motion suppression according to the invention. It is not possible to distinguish individual particles due to the motion. Motion is detected by the program as indicated by the exclamation mark at the top right corner of the application window. In the bottom left panel the motion amplitude is plotted against time. The right hand side of FIG. 3 shows a histogram of detected particle masses landing on the observations slide. There are not distinct peaks for the three different species of molecule because noise due to motion has interfered with the selection and identification process.

FIG. 4 depicts the same (ratiometric) frame captured on the IScat microscope but this time the motion has been corrected according to the invention. Two particles can clearly be seen as black circles and the motion amplitude plot in the bottom left panel shows much lower values than in FIG. 3. In the histogram calculated from the ratiometric frame, three distinct peaks can be seen, corresponding to the masses of three species of particle in the sample.

The microscope 1 may be used to perform IScat for a wide range of applications including single molecule detection. A particular application is label-free imaging of weak scatterers, where objects of interest have to be invariably detected on top of a large background, which reduces the imaging contrast. The microscope 1 may be used for a wide range of studies and measurements, for example to measure any changes in refractive index, which includes, for example: single molecule binding/unbinding, phase transitions, clustering, assembly/disassembly, aggregation, protein/protein interactions, protein/small molecule interactions, high-sensitivity label-free imaging.

Thus, there are numerous applications for the microscope 1, ranging from fundamental research to industrial applications, for example in the pharmaceutical industry. As an example, IScat is currently the world's most sensitive label-free single molecule imaging biosensor, which could have significant impact for example on the surface plasmon resonance sensing market. In addition, as described above microscope 1 can be used in mass measurement, functioning as an accurate, precise and highly resolved single molecule mass spectrometer in solution, with many applications in research and industry.

The invention claimed is:

1. A method of imaging a sample by interferometric scattering microscopy, the method comprising:
    illuminating a sample with at least one light source, the sample being held at a sample location comprising a reflective surface, such that a reflected signal is formed; the reflected signal comprising light from the light source and light scattered by the sample;
    detecting an output light over a first time window for a first frame $N_1$;
    detecting an output light over a second time window for a second frame $N_2$;
    calculating a ratiometric signal R which is: a ratio of $N_1$ and $N_2$, minus 1;
    estimating a ratiometric motion signature $S=(S_x, S_y)$ from the native camera frames $N_1$ and $N_2$, which is a ratiometric image which would be measured from an invariant sample moving along x and y for a given motion vector $m=(m_x, m_y)$;
    estimating m as a most consistent vector such that R is approximated using S and m;
    calculating a corrected ratiometric contrast image R* from R, S and m;
    wherein the corrected ratiometric contrast image frame R* is calculated as $R^* = R - (m_x S_x + m_y S_y)$.

2. A method according to claim 1 wherein horizontal and vertical ratiometric motion signature $S_x$ and $S_y$ at pixel location (x, y) are estimated from a native image N as:

$S_x[x,y] = (N[x+1,y] - N[x-1,y])/(2N[x,y])$ $S_y[x,y] = (N[x,y+1] - N[x,y-1])/(2N[x,y])$.

3. A method according to claim 1 wherein m is estimated as the most consistent vector such that:

$R = m_x S_x + m_y S_y$.

4. A method according to claim 1 further comprising moving the sample to compensate for motion.

5. A method according to claim 1 wherein an alert is triggered if detected motion is above a predetermined level.

6. A method according to claim 1 further comprising passing at least one of the reflected signal through a spatial filter, the spatial filter being configured to effect a reduction in intensity on incident radiation, the reduction in intensity being greater within a predetermined numerical aperture.

7. A method according to claim 1 wherein the light source is a coherent light source.

8. An interferometric scattering microscope comprising:
    a sample holder for holding a sample in a sample location;
    an illumination source arranged to provide illuminating light;
    a detector;
    an optical system being arranged to direct illuminating light onto the sample location and being arranged to collect output light in reflection, the output light comprising both light scattered from the sample location and illuminating light reflected from the sample location, and to direct the output light to the detector;
    a spatial filter positioned to filter the output light, the spatial filter being arranged to pass output light but with a reduction in intensity that is greater within a predetermined numerical aperture than at larger numerical apertures; and
    computer program means configured to instruct the interferometric scattering microscope to carry out the steps according to claim 1.

9. An interferometric scattering microscope according to claim 8 further comprising an actuator to stabilise the sample in response to the estimated motion vector m.

* * * * *